INVENTOR.
Harry K. Gougoulas
BY
Barnard, McGlynn & Reising
ATTORNEYS

Feb. 2, 1971 H. K. GOUGOULAS 3,559,225
VEHICLE CLEANING APPARATUS
Filed April 14, 1969 6 Sheets-Sheet 3

INVENTOR.
Harry K. Gougoulas
BY
Barnard, McGlynn & Reising
ATTORNEYS

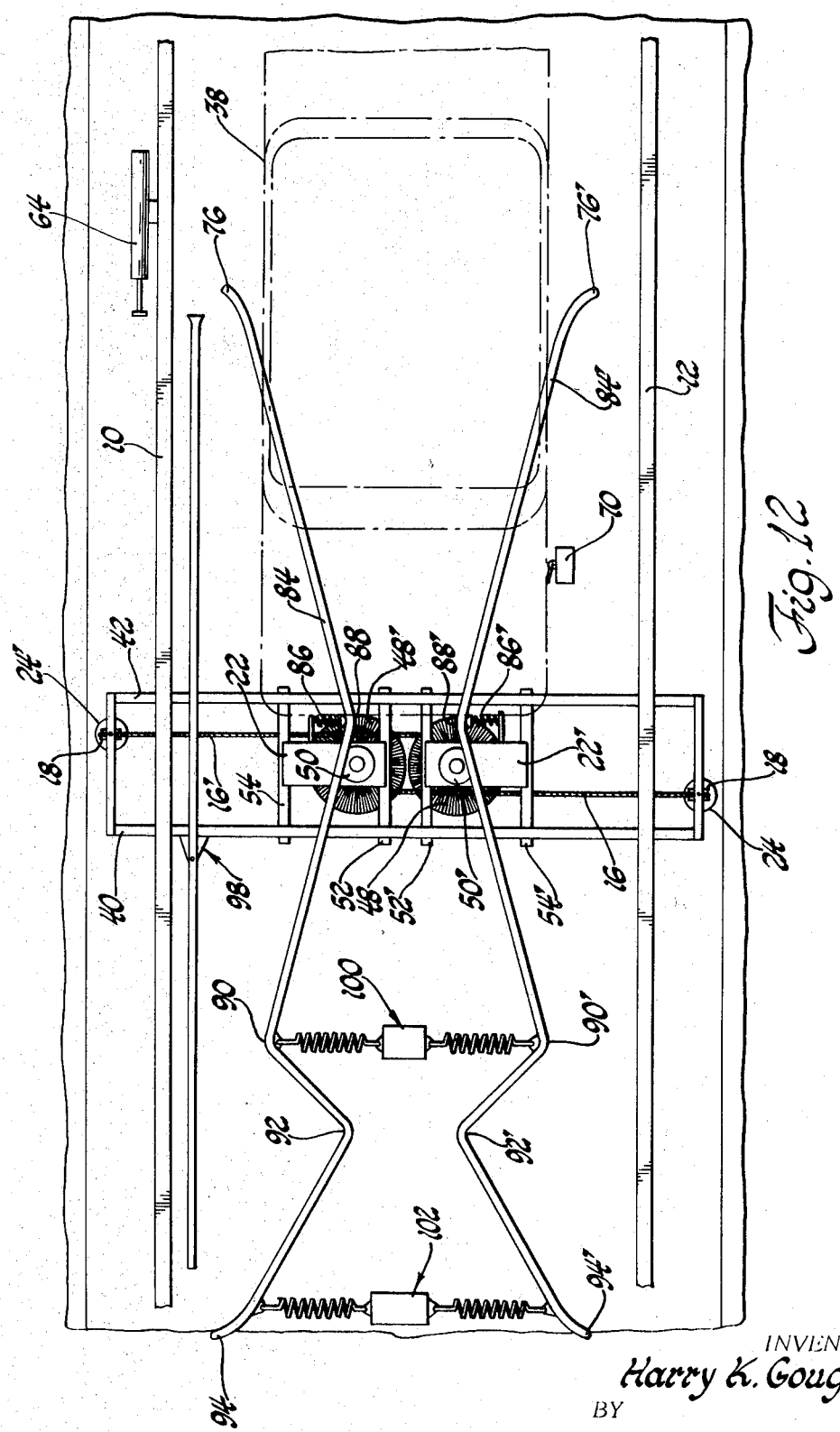

United States Patent Office 3,559,225
Patented Feb. 2, 1971

3,559,225
VEHICLE CLEANING APPARATUS
Harry K. Gougoulas, 1875 Philomine,
Lincoln Park, Mich. 48146
Continuation-in-part of application Ser. No. 754,526,
July 30, 1968. This application Apr. 14, 1969, Ser.
No. 825,092
Int. Cl. B60s 3/06
U.S. Cl. 15—21                27 Claims

ABSTRACT OF THE DISCLOSURE

Vehicle cleaning apparatus comprising a washing area through which a vehicle progresses and at least one brush having a vertical axis of rotation and being suspended from trolleys so as to be movable transversely and longitudinally of the vehicle to be cleaned. In one embodiment, a single brush is moved in a substantially triangular path around a moving vehicle so that at least three complete sides of the vehicle are cleaned automatically. In another embodiment, two brushes are moved through reversely symmetrical triangular paths so that each brush cleans each of two sides of the vehicle partially and one side of the vehicle completely. In both embodiments, the brush or brushes and the trolleys to which the brush or brushes are mounted are connected by cables to counterweights to control brush movement relative to the vehicle in accordance with the individual dimensions of the vehicle.

---

This application is a continuation-in-part of U.S. Ser. No. 754,526 filed July 30, 1968 and now abandoned in the name of Harry K. Gougoulas and entitled Vehicle Cleaning Apparatus.

The present invention relates to vehicle cleaning apparatus of the type including at least one rotatable cylindrically shaped brush having displaceable support means to permit the brush to be displaced about the sides of a vehicle for cleaning purposes.

It is desirable in the design of vehicle cleaning apparatus that a major portion of the exterior of the vehicle be cleaned automatically in order to minimize the amount of manual labor connected with the cleaning of the vehicle. Additionally, it is desirable that certain difficult-to-reach areas of the vehicle be thoroughly cleaned again for the basic purpose of minimizing the manual labor involved. Normally, the more difficult areas of a vehicle to be cleaned are the front grill and bumper portions, and the rear portion. Because of the intense competition in vehicle cleaning apparatus, that is the competition of the "automatic" car washes, economy of manufacture is also extremely important.

The so-called "automatic" car washes of the prior art have attempted to solve the foregoing problem in many ways. For example, cylindrical brushes having vertical axes of rotation may be mounted on pivotal structures that extend out from a point beside a vehicle washing area. To accommodate a vehicle of substantial size, the brush and brush support structure and at least a portion of the brush drive mechanism must necessarily be suspended a considerable distance out from the pivot axis beside the vehicle washing area. This requires heavy support apparatus to carry the suspended elements which may add to the expense and complexity of such a system. Moreover, such pivoted brushes can follow the vehicle for only a very limited distance, often providing inadequate cleaning of the front surfaces and no significant cleaning of the rear surface at all.

Some prior art devices also encounter a problem when accommodating vehicles that vary widely in size. The brush assembly that will properly wash a vehicle that is in excess of eighteen feet in length and over six and a half in width may require a complex construction to properly clean a vehicle that is under twelve feet in length and narrower than five feet.

In accordance with the present invention, an automatic cleaning apparatus is provided which accommodates vehicles varying in size over a wide range without the need for heavy pivotal brush supports. In general, this is accomplished by suspending at least one brush from overhead displaceable support means such as trolleys for displacement along at least two axes relative to the vehicle.

The invention also permits at least one brush to be displaced about three sides of a vehicle in peripheral engagement therewith and in such a fashion as to automatically respond to the particular dimensions of the vehicle being cleaned. In general, this is accomplished by providing means such to permit the brush or brushes and overhead displaceable support means to travel away from an initial position in response to contact with a vehicle moving through a washing area and to return to the initial position as the brush or brushes pass over the final surface to be cleaned.

In a preferred form of the invention, one or more brushes supported by overhead trolleys are urged by a vehicle to be cleaned along a longitudinal axis. Means are provided for causing the brush or brushes to be displaced along a transverse axis in response to the longitudinal movement caused by the vehicle. Energy storing means such as counterweights suitably connected to the brush supports maintain the brush or brushes in contact with the surface of the vehicle during travel along the sides thereof and also drive the brush or brushes back toward the initial position after the vehicle sides have been cleaned.

Various features and advantages of the present invention will be readily appreciated upon reading the following specification which is to be taken with the accompanying drawings wherein:

FIG. 12 is a plan view of a modified form of the FIG. 10 embodiment.

Figure 1:
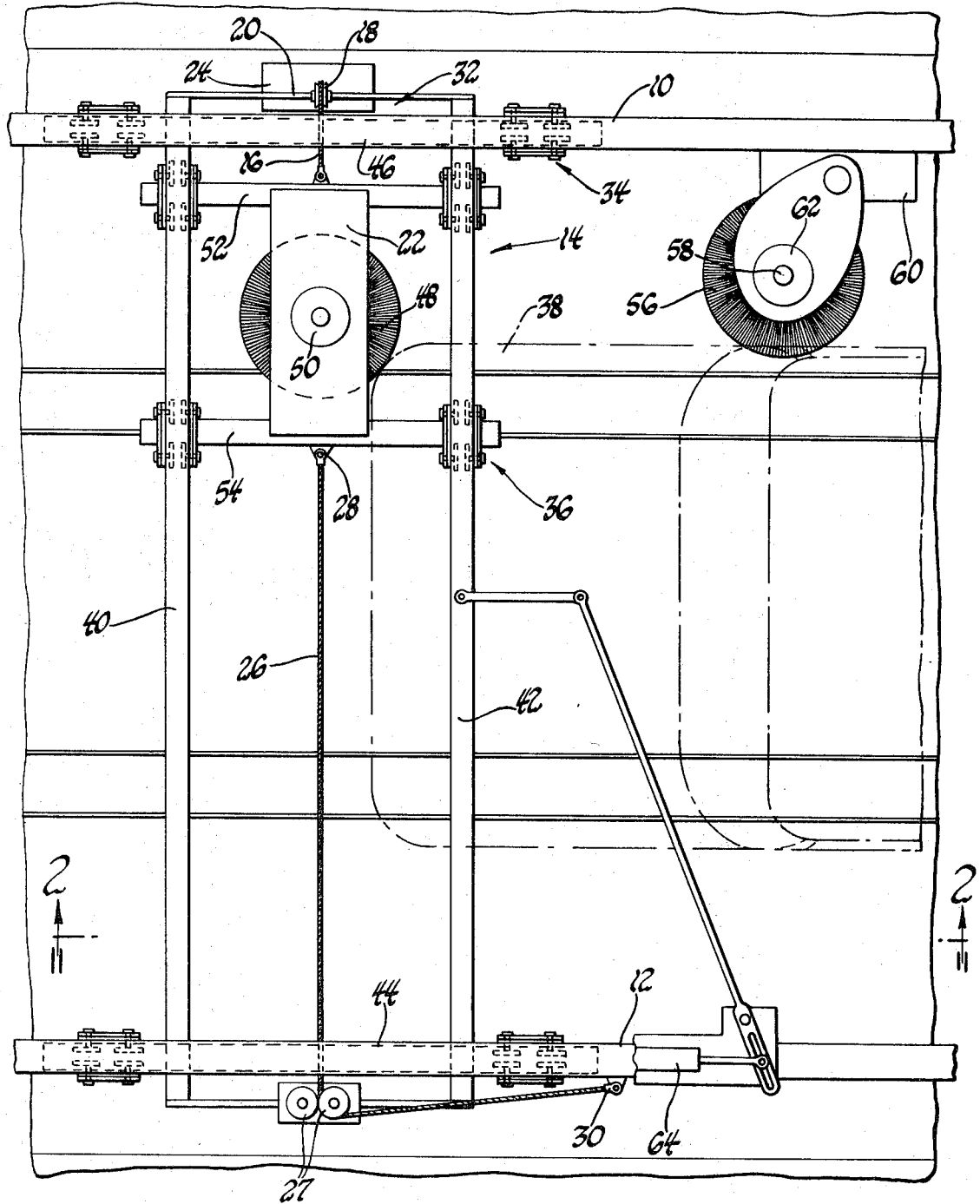
FIG. 1 is a plan view of one illustrative embodiment of the invention shown in the poised position.

Referring to FIG. 1, beams 10 and 12 are disposed overhead in a washing area and extend longitudinally with respect to a vehicle 38 and support a two axis trolley arrangement generally designated by numeral 14. An elongated member in the form of cable 16 is supported by pulley 18, pivotable at 20 and carried by arrangement 14. More specifically, cable 16 is connected at one end to beam 52 forming a portion of trolley arrangement 14 and at an opposite end is connected to counterweight 24 which biases trolley arrangement 14 to a poised position as later explained. Another elongated member in the form of a cable is pivotably connected to beam 54 at point 28 and at an opposite end is supported by pulley 27 and terminates at support 30. Cable 16, cable 26, weight 24, and beams 10 and 12 collectively form a brush displacement control means generally designated by numeral 32.

Trolley arrangement 14 is carried by beams 10 and 12 and comprises a first trolley 34 and a second trolley 36. First trolley 34 is carried by beams 10 and 12 and is movable longitudinally with respect to vehicle 38 to be cleaned. Second trolley 36 is carried by first trolley 34 and is movable transversely with respect to vehicle 38. First trolley 34 is rollably disposed on beams 40 and 42, carried by beams 44 and 46 disposed between adjacent rollers of first trolley 34.

Figure 2:
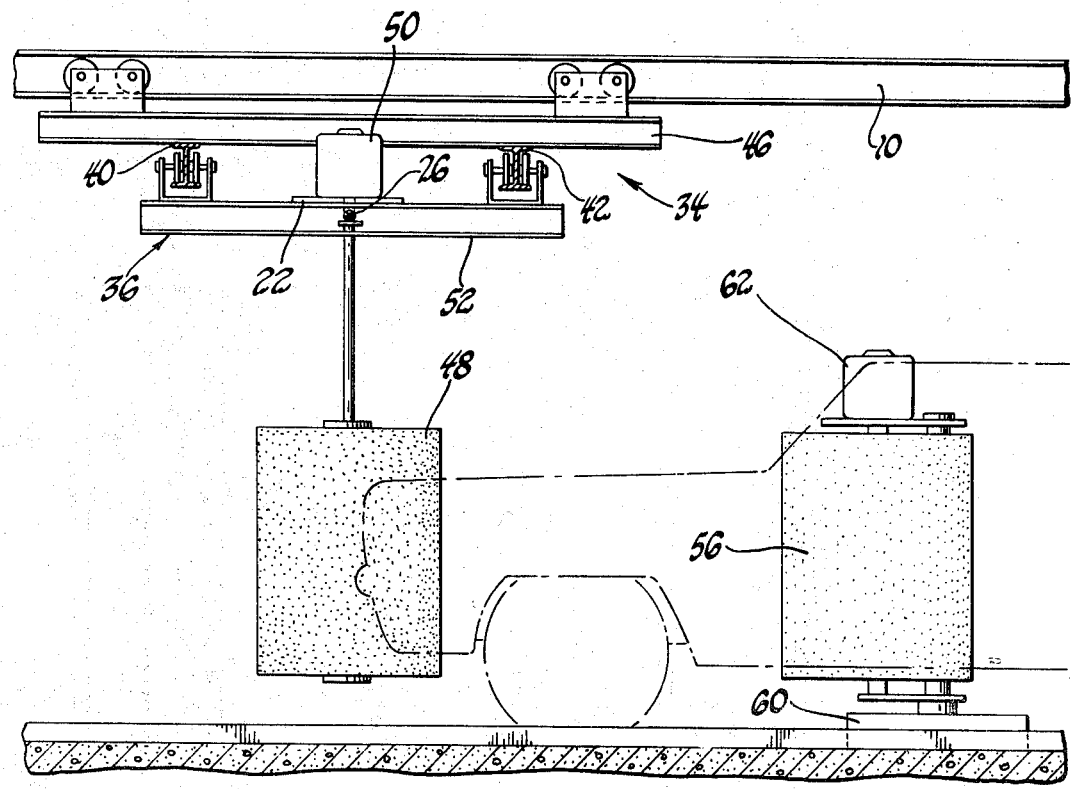
FIG. 2 is an elevational view of the FIG. 1 embodiment.

Trolley arrangement 14 carries brush 48 which is rotatably driven by motor 50, best seen in FIG. 2, and has a vertical axis of rotation. More specifically, brush 48 and motor 50 are carried by support member 22, suspended between beam 52 and beam 54. Therefore, it becomes clear that brush 48 is positionable at any point on the outer surface of a vehicle to be cleaned regardless of the size of the vehicle and is movable across at least three sides of vehicle 38. In other words, second trolley 36 is rollable on beams 40 and 42 respectively to any point transversely of the space between beams 10 and 12 and first trolley 34 in turn carries trolley 36 and is rollable to any point on beams 10 and beams 12 depending on the length of cable 26 which is fixed to support 30. It has been found that first trolley 34 should move at least three feet forward from a line defined by a connection between point 20 and support 30 to adequately clean the front of most vehicles of the passenger type.

Referring to FIG. 1, the cleaning apparatus further includes a fixed brush 56 which is rotatable on vertical axis 58, and is carried by support 60, fixed with respect to the ground, and also seen in FIG. 2. In FIG. 1, brush 56 is shown as being pivotable with respect to support 60 and is rotatable by motor 62 carried on support 60 so that brush 56 is in interfering engagement with the outer surface of one side of the vehicle to be cleaned. Support 60, in a preferred form, may be tilted slightly with respect to the ground so that gravity alone will carry brush 56 to its outermost extension with respect to support means 60. Brush 56 may be carried by a parallelogram type linkage substantially of the type shown in copending application Ser. No. 748,778, filed July 30, 1968, also filed in the name of the inventor of the present invention.

Figure 3:
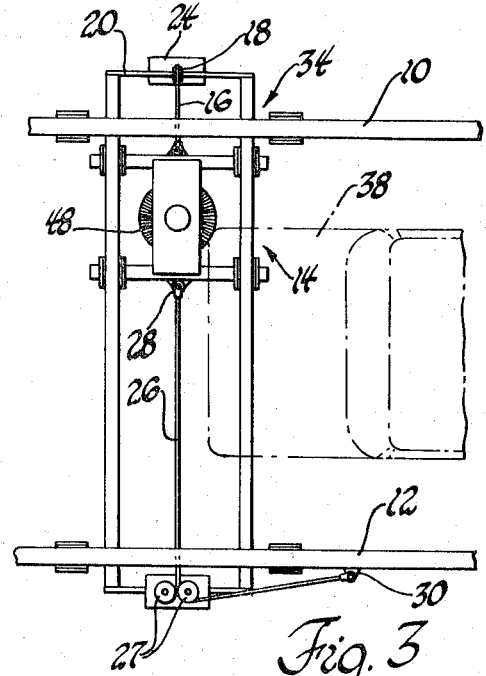
FIG. 3 is a plan view of the FIG. 1 embodiment showing the brush assembly at the beginning of its cycle.

In operation, and referring to FIG. 3, brush 48 is rotating as vehicle 38 enters the washing area. As vehicle 38 progresses to the left, as viewed in FIG. 3, the right front fender thereof contacts brush 48 causing first trolley 34 to move toward the left, and second trolley 36 to move perpendicularly with respect thereto due to the engagement thereof with cable 26. The resulting motion is an angular, or slightly arcuate, movement of brush 48 relative to beam 10 in the direction of beam 12. Therefore, due to the fixed length of cable 26, brush 48 effectively pivots about support 30 as vehicle 38 moves to the left as viewed in FIG. 3. Brush 48, consequently, moves across the front of vehicle 38 and forwardly to a point limited by the length of cable 26. It should be noted that cable 16, attached to beam 52 of second trolley 36, draws weight 24 upwardly as cable 16 moves relative to pulley 18. It should also be noted that, due to the mounting of cable 16 and 26 on beams 46 and 44 respectively, trolley 36 tends to move on beams 40 and 42 without any lateral loading.

Figure 4:
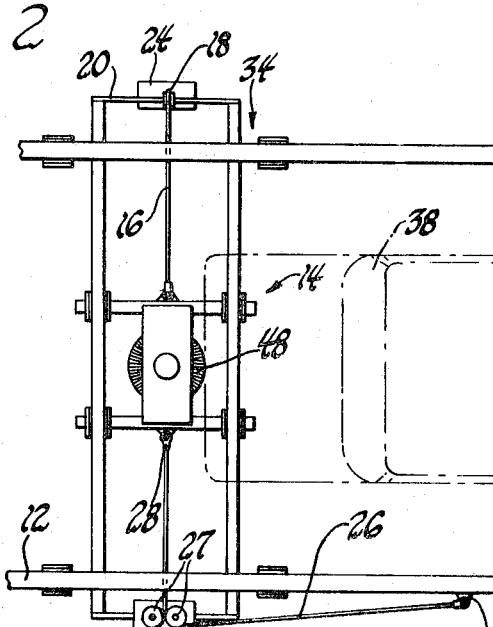
FIG. 4 is a plan view of the FIG. 1 embodiment showing the brush assembly part way through a portion of the cycle wherein the front of the vehicle is being cleaned.

Referring to FIG. 4, brush 48 is seen partially through its movement across the front of vehicle 38, and it should be noted that cable 26 is still taut.

Figure 5:
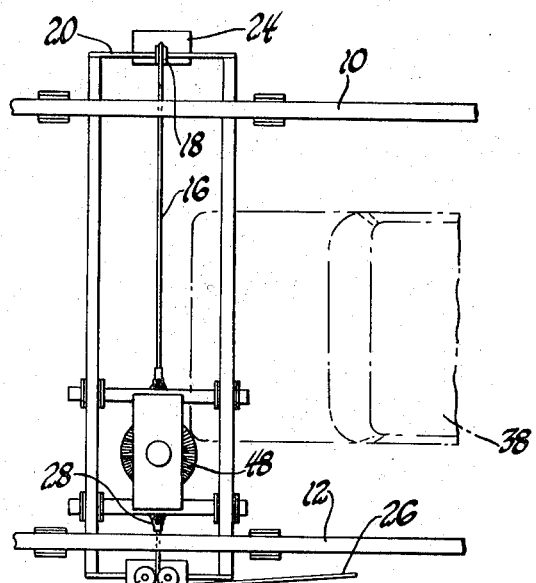
FIG. 5 is a plan view of the FIG. 1 embodiment showing the brush assembly at the point where the front end cleaning is completed and the side cleaning is begun.
Figure 6:
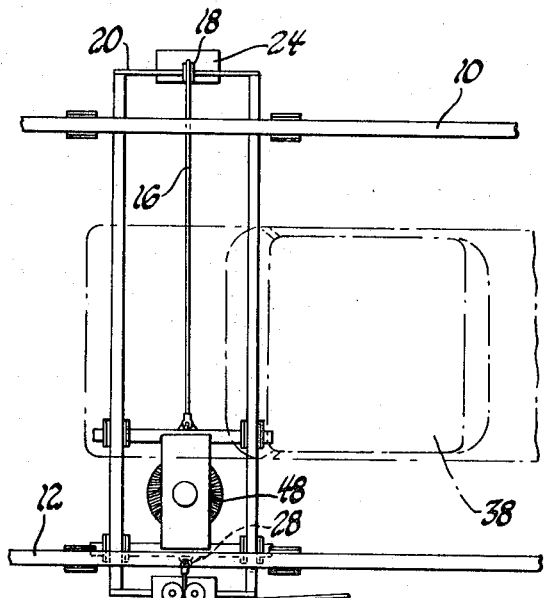
FIG. 6 is a plan view of the FIG. 1 embodiment showing the brush assembly part way through the side cleaning of the vehicle.

Referring to FIG. 5, brush 48 is now disposed at the left front corner of vehicle 38 and is preparing to move back along the left side of the vehicle 38 as shown in FIG. 6.

In FIG. 6, cable 16 has reached its furthest extension, and the rotative movement of the bristles of brush 48, acting against the outer surface of vehicle 38, tends to move brush 48 along with second trolley 36 and first trolley 34 to a centered position with respect to support 30. Brush 48, therefore, will move to a point approximately half the distance from the front of the vehicle 38 with respect to the rear thereof by the force of its own rotation, it being understood that vehicle 38 is constantly moving during the process.

From this point rearwardly, that is the point defined by the centered position previously set forth, cylinder 64 is energized by any common switch, not shown, and moves brush 48 from the previously mentioned position to the rear corner of the vehicle. The distance, of course, can be varied depending on the speed of vehicle 38; but it has been found in practice that trolley 34 actually moves about four feet. These dimensions are favorable for use with car washing equipment, cleaning approximately 120 cars per hour.

Figure 7:
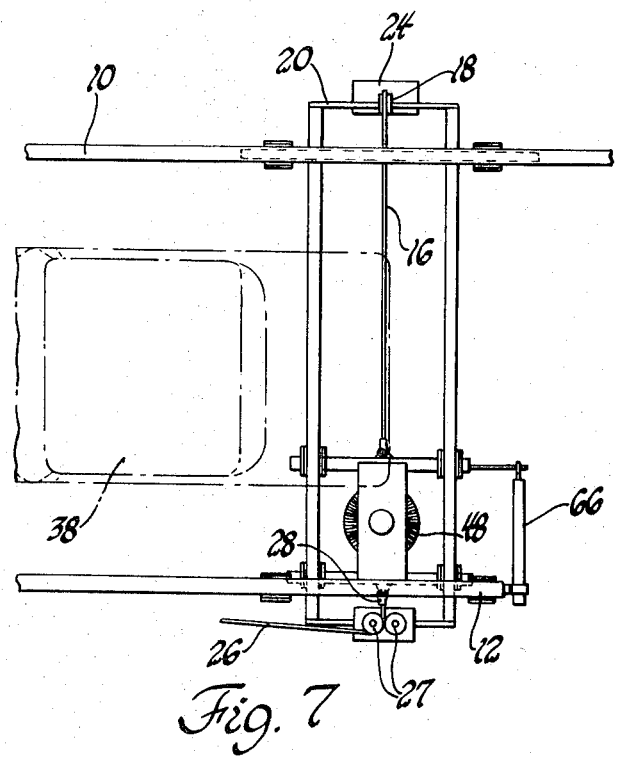
FIG. 7 is a plan view of the FIG. 1 embodiment showing the brush assembly completing the side cleaning of the vehicle and beginning the cleaning of the rear of the vehicle.

When brush 48 reaches the point substantially as shown in FIG. 7, its own rotation tends to carry it in the direction of beam 10, it being understood that a typical limit switch operating a solenoid valve, not shown, has de-energized air cylinder 64. This movement is generated both because of the force generated by weight 24 acting against cable 16 and the rotational tendency of brush 48 tends to move brush 48 across the rear of the vehicle. The combination of the force of weight 24 and the rotational tendency of brush 48 would move brush 48 too rapidly across the vehicle but for an impedance set up by door-closer type cylinder 66 acting between first means 32 and second means 14. Cylinder 66 slows the movement of second trolley 36 across beams 40 and 42 toward a poised position. Therefore, the actual movement of brush 48 across the rear of vehicle 38 is at an angle with respect to beam 10 and in the direction of point 20. The composite path of movement then of brush 48 is substantially triangular in shape.

Figure 8:
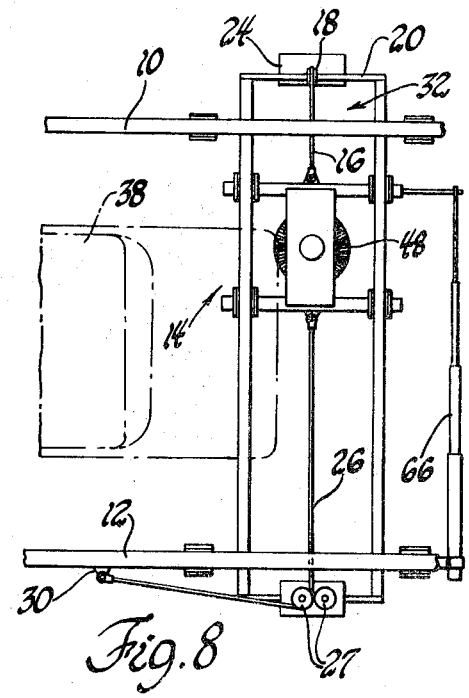
FIG. 8 is a plan view of the FIG. 1 embodiment showing the brush assembly completing the cleaning of the rear of the vehicle.

In FIG. 8 is shown the position of brush 48 as it is completing its movement across the rear of vehicle 38. Brush 48 has returned essentially to the position shown in FIGS. 1 and 3, which is the poised position, with brush 48 ready to be contacted by the front end of the next advancing vehicle in the car wash area.

Referring to FIG. 1, brush 56 has been rotating during the aforementioned cycle and contacts the right front portion of vehicle 38 before the vehicle contacts brush 48. Therefore, brush 56 is very slowly cleaning the right side of vehicle 38 as brush 48 is making a cleaning motion from the right corner of the vehicle to the right rear corner thereof. Consequently, all four sides of the vehicle have been cleaned automatically. The only cycling or powered equipment utilized is air cylinder 64, it being understood that air cylinder 64 is a one-way cylinder, that is, is powered in one direction and represents no resistance to movement in the opposite direction. It should also be noted that the cable 26 can be provided with a force responsive switch, not shown, to stop the movement of vehicle 38 through the car wash area if brush 48 somehow becomes jammed with respect to the moving vehicle. This switch is a well known expedient.

Therefore, the present invention teaches vehicle cleaning apparatus and includes control means 32 and trolley arrangement 14 carried by overhead beams 10 and 12 and having a brush 48, movable across at least three complete sides of the vehicle to be cleaned, the control means 32 including cables 16 and 26 coacting with trolleys 34 and 36 so that they respond to the dimension of the vehicle to control the movement of trolley arrangement 14. A plurality of trolleys, that is, the first trolley 34 and second trolley 36, carried by fixed beams 10 and 12, allow brush 48 to be moved to any point on the outer surface of the vehicle with the exception of the side of the vehicle cleaned by brush 56. The mechanism is very simple to construct and involves no more intricate support mechanisms than the "I" beams hereinbefore set forth. Brush 48 is a cylindrical brush which is vertically supported from member 22 so that when rotating on its axis, its outer periphery contacts the outer surface of the vehicle. Brush 48 is a standard type brush commercially available. All of the other components of the system are likewise commercially available, diminishing the expense of constructing the system herein disclosed. It should be understood that all sides of a vehicle can also be cleaned automatically by positioning two of the systems shown herein on opposite sides of a vehicle in a car wash area as hereinafter described.

Figure 9:
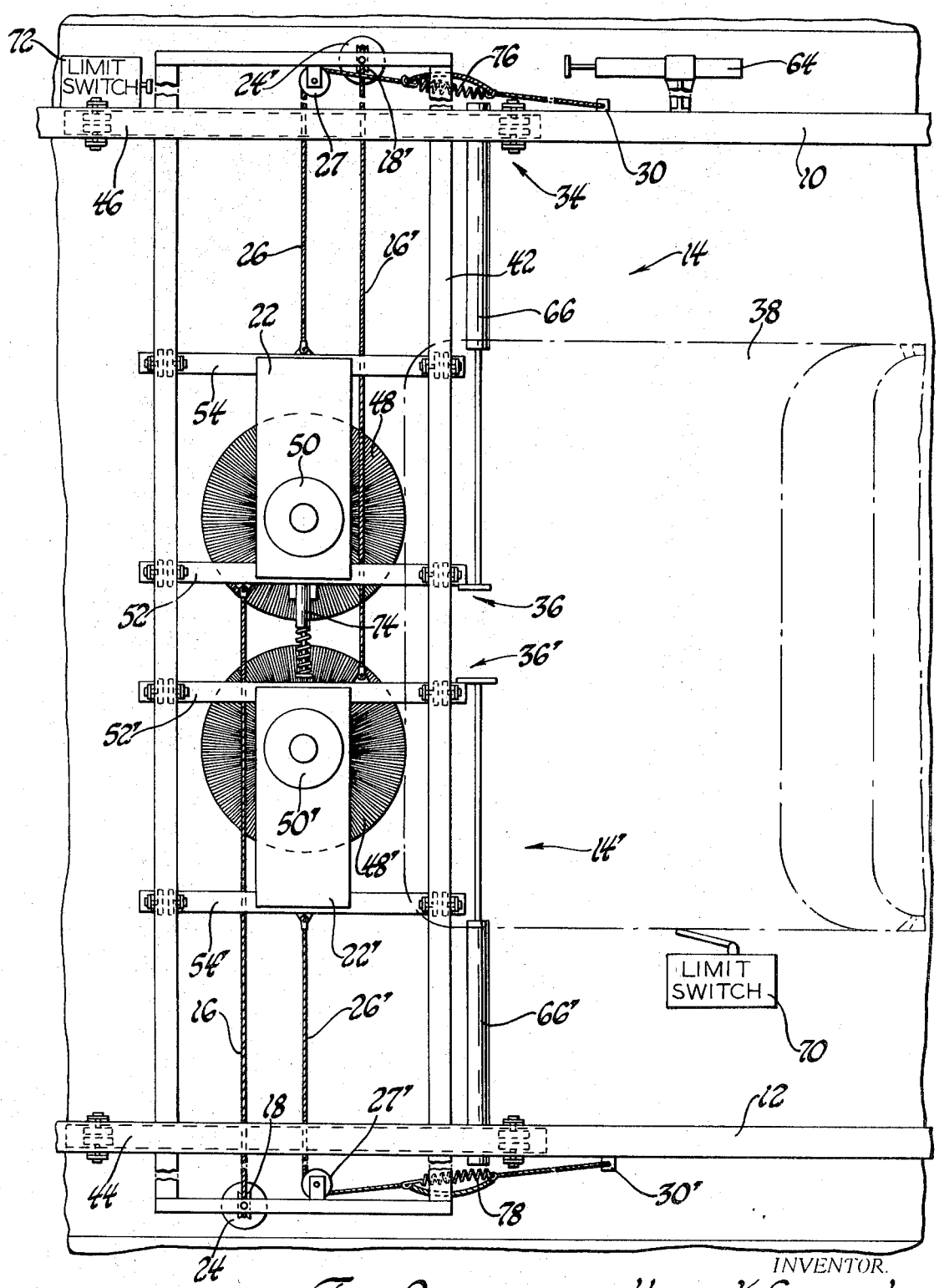
FIG. 9 is a plan view of a second illustrative embodiment of the invention employing two displaceable brushes having vertical axes of rotation.

Referring now to FIG. 9 there is shown a second embodiment of the invention including a pair of displaceable brushes 48 and 48' suspended relative to trolley arrangements 14 and 14' for rotation about substantially vertical axes. In the following description of the embodiment of FIGS. 9, 10, and 11 reference numerals corresponding to those found in the foregoing description of FIGS. 1 through 8 will be used to identify like components. Moreover, due to the reversely symmetrical nature of the apparatus described with reference to FIGS. 9, 10, and 11 corresponding elements are identified with corresponding reference numerals, one set of numerals being primed to indicate the separate but like nature of the elements.

FIG. 9 shows brushes 48 and 48' to be arranged symmetrically about the center line of a vehicle 38 which travels from right to left as seen in the drawings through a washing area. Brush 48 is suspended from support member 22 for rotation about a vertical axis when driven by a reversible motor 50. Support member 22 is carried by beams 52 and 54 which are supported by cross-beams 40 and 42 movable longitudinally on first trolley 34. Beams 52 and 54 form part of a second trolley 36 which permits the support member 22, the brush 48, and the motor 50 to be displaced transversely with respect to the direction of travel of vehicle 38 along beams 40 and 42. Support member 22' is similarly carried by beams 52' and 54' which travel transversely of the vehicle 38 on beams 40 and 42.

Beam 52 is connected to a cable 16 which extends through a pulley 18 and is connected at its other end to a counterweight 24. With the apparatus in the disposition shown in FIG. 9 counterweight 24 is near its lowest point and is raised to a stored energy position by displacement of support member 22 and the beams 52 and 54 toward the right-hand side of the vehicle 38 as shown in the drawing. Support member 22 is also pivotally connected to a second cable 26 which extends transversely across the path of vehicle travel to a pulley 27 and thence to a support 30 attached to beam 10. A slack take-up spring 76 is connected to cable 26 so as to provide a slack loop under untensioned conditions but to permit the cable 26 to be straightened under tension as the beams 40 and 42 carry the support member 22 in the direction of vehicle travel.

Support means 22' is similarly connected to a first cable 16' which extends laterally across the path of vehicle travel to a pulley 18' and thence to a counterweight 24'. The counterweight 24' is thus raised to a stored energy position as the support member 22' and brush 48' are displaced away from the support member 22 and the brush 48. The other side of support member 22' is connected to a second cable 26' which extends through a pulley 27' to a support 30' on beam 12. A slack take-up spring 78 is connected with cable 26' to provide a slack loop under untensioned conditions in the same manner as performed by take-up spring 76. Brush 48' is also rotated about its vertical axis by reversible motor 50' to scrub the surface of the vehicle 36 adjacent the periphery of the brush 48'. A compressible type bumper 74 may be mounted on beam 52 to extend toward beam 52' to prevent contact between the beams. Bumper 74 is not essential as mechanical pulley stops or other means may also be employed.

A pneumatic or hydraulic damper cylinder 66 is connected between beam 10 and beam 52 to impede inward displacement of the support member 22 and the supporting beams 52 and 54 relative to beam 10. Correspondingly, a cylinder 66' is connected between beam 12 and beam 52' to damp inward displacement of the support member 22' and the associated trolley components relative to beam 12.

Figure 10:
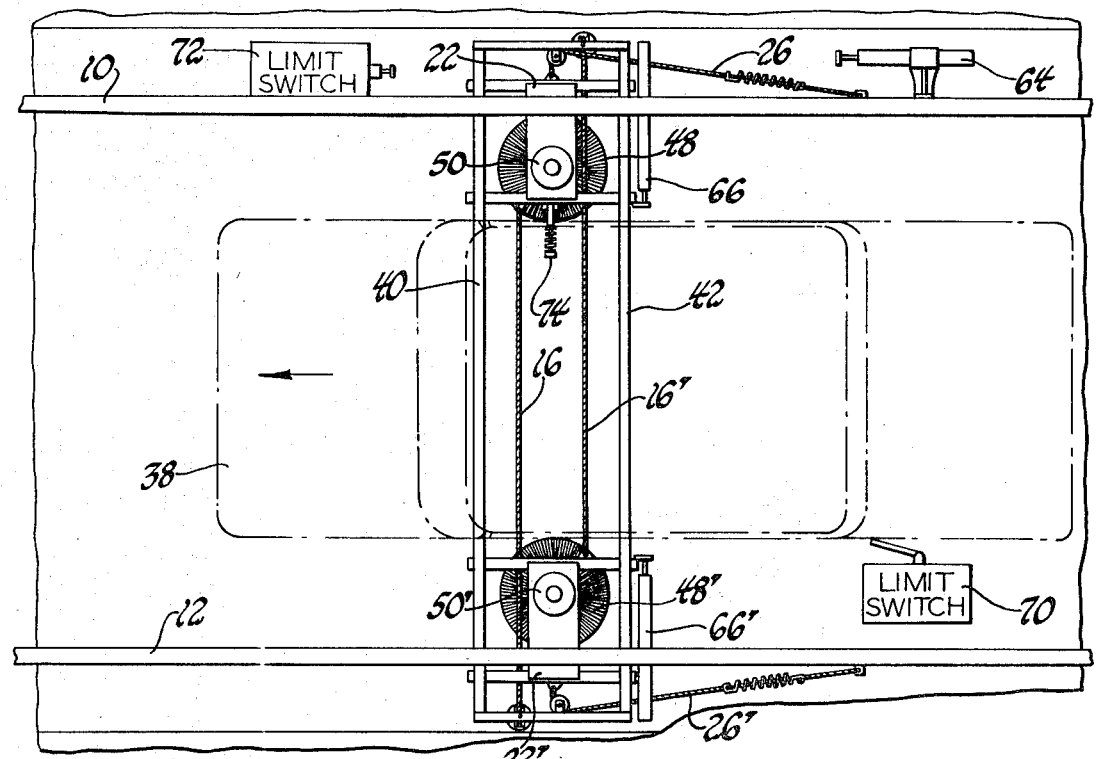
FIG. 10 is a plan view of the second embodiment showing the brushes traveling along the side surface of a vehicle.
Figure 11:
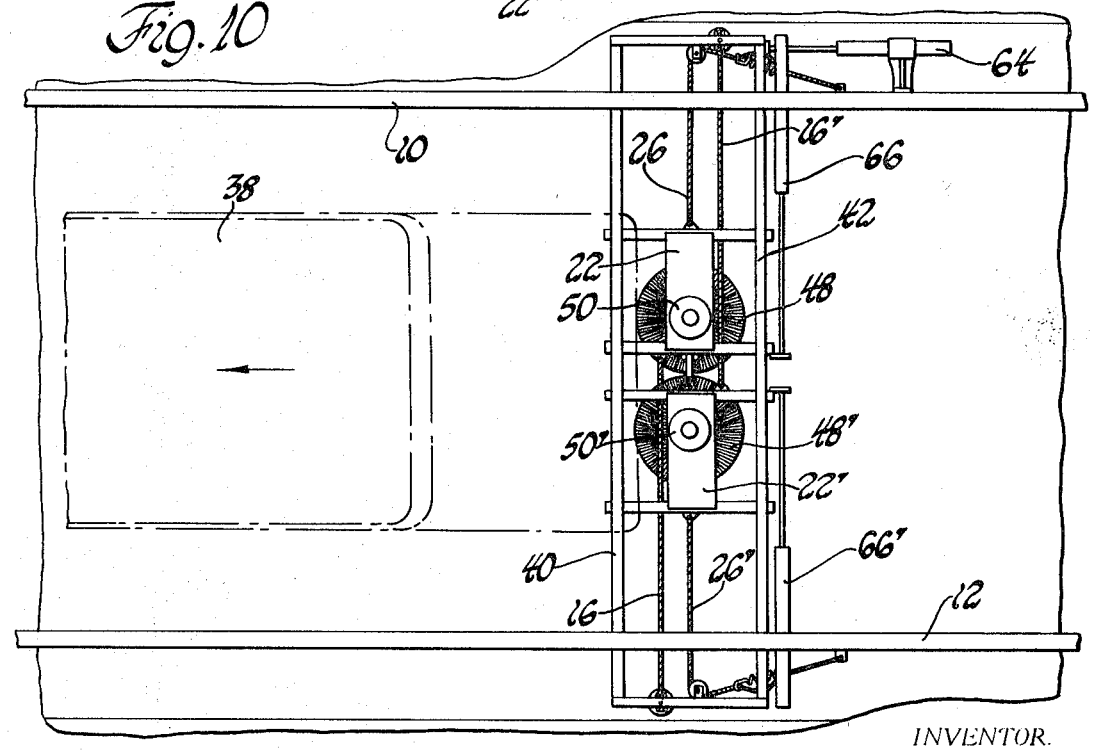
FIG. 11 is a plan view of the second embodiment showing the disposition of the brushes at the completion of a displacement cycle.

The apparatus shown in FIGS. 9, 10, and 11 further includes a limit switch 70 of the type having a feeler engageable with vehicle 38 to establish an initial electrical circuit including motors 50 and 50' thereby to initiate operation of the apparatus and rotation of the brushes 48 and 48'. To initiate further steps in the car washing sequence, the apparatus includes a limit switch 72 which is mounted on beam 10 and has a depressible plunger positioned to be operated by beam 40 to reverse the direction of rotation of motors 50 and 50'. Finally an air cylinder 64 is monuted on beam 10 and is energizable to urge trolley beams 40 and 42 and the components mounted thereon in the forward direction against the rear surface of vehicle 38 as generally indicated in FIG. 11.

Discussing now the operation of the embodiment of the invention shown in FIGS. 9, 10, and 11 reference is first made to FIG. 9. A vehicle 38 enters a washing area within which the apparatus is installed. In doing so, vehicle 38 operates limit 70 to energize brush motors 50 and 50'. The initial energization of motors 50 and 50' causes brush 48' to rotate in a clockwise direction and brush 48 to rotate in a counterclockwise direction. As vehicle 38 approaches brushes 48 and 48', the front surface of the vehicle 38 is scrubbed by the periphery of the brushes. Further advance of vehicle 38 in the direction of brushes 48 and 48' causes displacement of beams 40 and 42 in the direction of vehicle travel. A suitable friction brake may be employed to regulate such forward displacement. The first increment of such displacement relieves the slack in cables 26 and 26' and tensions the cables to begin withdrawing brushes 48 and 48' from their adjacent positions. Further progress of vehicle 38 urges the trolley assembly including beams 40 and 42 in the direction of vehicle travel and causes the brushes 48 and 48' to draw outwardly apart thus cleaning the entire front surface of the vehicle 38 and raising counterweights 24 and 24' to a stored energy position. As the beam 40 approaches limit switch 72, the brushes 48 and 48' approach the front corners of vehicle 38. Just before the brushes 48 and 48' arrive at the front corners and are poised to begin travel along the sides of the vehicle, limit switch 72 is operated by beam 40 to reverse the directions of motor 50 and 50'. Upon such reversal, brush 48' is thereafter driven in the counterclockwise direction and brush 48 is driven in a clockwise direction. At the time this direction reversal is made, counterweights 24 and 24' have been elevated to nearly their uppermost positions and thus store potential energy which can be used to return the brushes 48 and 48' to their adjacent position as is further described hereinafter.

Referring now to FIG. 10, the brush 48 rotating in the clockwise direction travels by force of its own rotation along the right-hand side surface of vehicle 38 as shown in the drawing. Similarly, brush 48' by force of its own counterclockwise rotation drives itself and the associated trolley assemblies along the left-hand side surface of vehicle 38. Counterweights 24 and 24' aid in maintaining the brushes 48 and 48' against the sides of the vehicle. The vehicle 38 continues to advance tvoward the left as shown in the drawing and, therefore, the combined action of the right-hand travel of the trolley assembly including beams 40 and 42 and the left-hand travel of the vehicle causes the brushes 48 and 48' to scrub and clean the side surfaces to the vehicle. As the brushes 48 and 48' arrive at the rear corners of the vehicle 38, the counterweights 24 and 24' still store potential energy which upon sufficient forward displacement of vehicle 38 will cause the brushes to move toward one another thereby to scrub the rear surface of the vehicle.

Referring to FIG. 11 the vehicle 38 progresses to the left as shown in the drawing to permit the brushes 48 and 48' to move back toward one another as shown in FIG. 11. The trolley assembly is displaced rearwardly along beams 10 and 12 toward the air cylinder 64 until such time as beam 42 engages the extensible member of the air cylinder. At this time a conventional limit switch, not shown, actuates air cylinder 64 to drive the trolley assembly including beam 42 forwardly in the same direction as the vehicle 38 is traveling. This operation continues to urge the brushes 48 and 48' against the rear surface of the vehicle as the stored potential energy of counterweights 24 and 24' causes the brushes 48 and 48' to move back toward one another. Damper cylinders 66 and 66' cause the brushes to move slowly across the rear surface of vehicle 38. Accordingly, the rear surface of vehicle 38 is thoroughly cleaned.

As the vehicle 38 continues to progress to the left as shown in the drawing it ultimately travels out of engagement with brushes 48 and 48' as well as limit switch 70 thereby to return the entire apparatus to the poised position in preparation for the approach of another vehicle.

Summarizing the operation of the apparatus shown in FIGS. 9, 10, and 11 the approach of vehicle 38 starts the rotation of brushes 48 and 48'. Further advance of the vehicle tends to displace the trolley arrangements 14 and 14' including beams 40 and 42 with the vehicle thereby separating the brush and brush support assemblies and raising the counterweights 24 and 24' to a stored energy position. As the brushes 48 and 48' approach the front corners of the vehicle, the direction of brush rotation is reversed thereby to drive the brushes along the side surfaces of the vehicle. As the brushes approach the rear corners of the vehicle, the stored energy in the counterweights 24 and 24' causes the brushes 48 and 48' to move back toward one another thereby to scrub the rear surface of the vehicle 38. In addition, air cylinder 64 urges the trolley assembly along beams 10 and 12 to maintain the brushes in contact with the rear surface of the vehicle.

Referring now to FIG. 12, a modification of the double-brush embodiment is shown to include a pair of overhead cam rails 84 and 84' to control the lateral displacement of brushes 48 and 48' in predetermined relation to the longitudinal displacement thereof. As in FIGS. 9 through 11, the apparatus includes reversely similar components arranged about a longitudinal centerline defining the path of vehicle travel and primed reference characters are used ot indicate the similarity.

Brush 48, for example, is mounted on the two-axis trolley described with reference to FIG. 9 and is connected to counterweight 24 via cable 16 to urge the brush toward the center of the path of vehicle travel. In addition, a contoured cam rail 84, suspended overhead in the washing area, causes the brush 48 and the support member 22 to follow a prescribed lateral path which is coordinated with the longitudinal displacement of the brush to provide efficient cleaning action. Support member is resiliently biased relative to the cam rail 84 by means of a spring-loaded follower 86 which engages the rail.

Cam rail 84 includes a first laterally innermost point 88 which defines the initial position of brush 48. From point 88, cam rail 84 angles laterally outwardly toward reversely curved portion 90 over a longitudinal distance of approximately four feet, then angles inwardly toward a second inwardly disposed point 92 over a longitudinal distance of approximately one foot, then angles outwardly toward a forward end point 94 over a longitudinal distance of approximately three feet. Cam rail 84 also extends back from point 88 a distance of approximately four feet and is inwardly angled over this distance from an end point 96 toward point 88. Reversely similar cam rail 84' follows a mirror image path to guide brush 48' in its lateral displacement. At points 90, 90' and 94, 94', rails 84 and 84' may be laterally supported by heavy spring units 100 and 102 to allow the rails to be laterally inwardly compressed under circumstances hereinafter described.

In operation, brushes 48 and 48' are disposed in an initial position adjacent points 88 and 88' of cam rails 84 and 84', respectively. Counterweights 24 and 24' urge the followers 86, 86' against the cam rails 84 and 84', respectively. Upon approach of vehicle 38, the brushes are set in rotation by motors 50 and 50' to engage the front surface of the vehicle. As the vehicle 38 urges the brushes forwardly, displacing the trolleys as previously explained with reference to FIGS. 9 through 11, the rail followers 86 and 86' cause the brushes to separate laterally by following the cam rail section between points 88 and 90 of rail 84 and points 88' and 90' of rail 84'. This separation of brushes 48 and 48' cleans the front surface of vehicle 38. A friction brake 98 including a narrow guide track and a finger mounted on beam 42 to ride on the track provides drag on the trolley to keep it from rolling ahead of vehicle 38. Between points 90 and 92 of rail 84 and corresponding points 90' and 92' of rail 84', further forward displacement causes the brushes to converge toward one another to make a return pass over the front of vehicle 38. Between points 92 and 94, 92' and 94', the brushes 48 and 48' again diverge to progress outwardly across the front of vehicle 38.

At points 94 and 94', the brushes reach the outside corners of vehicle 38 and may then pass down along the sides of the vehicle as explained with reference to FIG. 9. Just prior to reaching points 94 and 94', brush rotation may be reversed to rotate brush 48 in the clockwise direction and brush 48' in the counterclockwise direction ot drive the brushes along the sides of vehicle 38 by force of their own rotation. During the pass along the vehicle sides, followers 86 and 86' are out of contact with the cam rails 84 and 84' and may automatically adjust to the width of vehicle 38.

At the rearmost points 96 and 96' of longitudinal brush travel, the brushes reach the rear corners of vehicle 38 and begin ot converge. Counterweights 24 and 24' urge the brushes laterally inwardly toward the cam rails 84 and 84' thereafter to follow the converging rail sections between points 96, 96' and 88, 88'. Cylinder 64 is actuated to urge the trolley beam 42 forwardly to maintain the brushes in constant contact with the rear surface of the vehicle. Between rail points 96, 96' and 88, 88', the brushes follow the inwardly angled rail portions to complete the rear surface pass and to return to the initial brush position, ready for another vehicle. Reversal of brush rotation direction may be accomplished before reaching points 88 and 88'.

If the brushes 48 and 48' fail to separate for any reason, the spring units 100 and 102 permit the rails 84 and 84' to flex inwardly thereby to prevent damage to the equipment. Obviously, the spring constants of units 100 and 102 are chosen so that the units do not yield measurably under normal operating conditions.

It can be seen that the cam rails 84 and 84' eliminate the need for the cable connections 26 and 26' of the FIG. 9 embodiment, as well as the damper cylinders 66 and 66'. At the same time, the cam rails in regulating the lateral displacement of brushes 48 and 48', permit variations in the brush path program to permit the triple front surface path previously described. Otherwise, the modified embodiment of FIG. 12 operates like that of FIG. 9, the counterweights 24 and 24' performing energy storing functions to displace the brushes laterally inwardly as before.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the present invention in which an exclusive property or privilege is claimed are defined as follows:

1. Apparatus for cleaning a vehicle progressing through a washing area comprising: cleaning means for engaging the lateral exterior surfaces of a vehicle, fixed support means mounted in the area, displaceable support means mounted on the fixed support means and carrying the cleaning means for displacement relative to the vehicle along at least two axes of displacement, and control means interconnecting the fixed and displaceable support means for controlling the displacement of the displaceable support means over at least portions of three sides of the vehicle in accordance with the dimensions of the vehicle.

2. Apparatus as defined in claim 1 wherein the cleaning means includes a brush having a vertical axis of rotation.

3. Apparatus as defined in claim 2 wherein each of the fixed and displaceable support means includes a portion disposed overhead with respect to a vehicle in the washing area.

4. Apparatus as defined in claim 3 wherein the overhead portion includes a first trolley for permitting displacement of the cleaning means transversely of the vehicle and a second trolley for permitting displacement of the cleaning means longitudinally of the vehicle.

5. Apparatus as defined in claim 4 wherein the control means interconnects the first and second trolleys to control said transverse displacement in accordance with the longitudinal displacement of the cleaning means.

6. Apparatus as defined in claim 5 wherein the control means includes energy storing means connected between the fixed and displaceable support means for storing energy in response to transverse displacement of the displaceable support means in a first direction and providing energy tending to displace the displaceable support means transversely in the opposite direction.

7. Apparatus as defined in claim 5 wherein the energy storage means includes a counterweight suspended relative to a fixed support means and a first cable connecting the fixed support means to the displaceable support means and the counterweight to raise the counterweight upon transverse displacement of the displaceable support means in said one direction.

8. Apparatus as defined in claim 5 wherein the cleaning means is displaced along at least one surface of the vehicle by force of its own rotation.

9. Apparatus as defined in claim 8 wherein the cleaning means is normally disposed adjacent a front corner of a vehicle entering the cleaning area and is displaced across the front surface of the vehicle to cause transverse displacement of the first trolley in one direction, along a side surface of the vehicle to cause longitudinal displacement of the second trolley, and across the rear surface of the vehicle to cause transverse displacement of the first trolley opposite to said one direction thereby to describe a substantially triangular path of displacement.

10. Apparatus as defined in claim 9 including power means connected between the fixed and displaceable support means to urge the cleaning means in the longitudinal direction.

11. Apparatus as defined in claim 9 including damper means for controlling transverse displacement speed of the cleaning means.

12. Apparatus as defined in claim 9 further including fixed cleaning means disposed in the washing area to clean one side surface of the vehicle as the vehicle progresses thereby.

13. Apparatus as defined in claim 12 wherein the fixed cleaning means includes a brush having a vertical axis of rotation.

14. Apparatus for cleaning a vehicle progressing along a path through a washing area comprising: first and second brushes having substantially parallel and vertical axes of rotation for engaging the exterior surfaces of a vehicle, first and second displaceable support means carrying the first and second brushes, respectively, for displacement along both longitudinal and transverse axes relative to the vehicle path, said first and second support means being carried by a first overhead trolley for longitudinal displacement along the vehicle path and a pair of second trolleys mounted on the first trolley for transverse displacement therealong such that the brushes are normally transversely adjacent one another but are displaceable transversely away from one another, and control means associated with the first and second support means for controlling displacement of the brushes in accordance with the dimensions of the vehicle.

15. Apparatus as defined in claim 14 wherein the control means includes first means responsive to longitudinal displacement of the first trolley to produce transverse displacement of the brushes, and energy storing means connected to the first and second support means for storing energy upon transverse displacement thereof in one direction to bias the respective support means in the opposite direction.

16. Apparatus as defined in claim 15 wherein the first means includes first and second cables connecting the first and second support means to fixed points relative to the washing area whereby longitudinal displacement of the first trolley laterally separates the first and second brushes, against the bias of the energy storing means.

17. Apparatus as defined in claim 15 wherein the first means includes first and second cam rails of reversely similar contour extending substantially longitudinally through the washing area, first and second follower means mounted on the first and second support means and engaging the first and second cam rails, respectively, said energy storing means biasing the support means toward the cam rails whereby longitudinal displacement of the brushes causes the support means to follow a path defined by the cam rails.

18. Apparatus as defined in claim 17 wherein each of the cam rails includes a section angled outwardly from the centerline of the vehicle path through the washing area, and a contiguous section angled inwardly toward the centerline.

19. Apparatus as defined in claim 15 wherein the energy means are elevatable counterweights.

20. Apparatus as defined in claim 15 wherein the first and second brushes are symmetrically disposed about the path of vehicle progression in the washing area, the control means providing an initial position for the brushes in said path of progression to engage the front surface of a vehicle in the washing area from which the brushes are transversely displaced across the front surface in response to progression of the vehicle, longitudinally displaced along the sides of the vehicle and transversely across the rear surface of the vehicle to the initial position.

21. Apparatus as defined in claim 20 including means for rotating the brushes in a direction to produce a force tending to displace the brushes longitudinally along the sides of the vehicle.

22. Apparatus as defined in claim 21 including first and second damper means associated with respective second trolleys to control the speed of transverse displacement thereof.

23. Apparatus as defined in claim 20 including power means to urge the brushes in the direction of vehicle progression during transverse displacement thereof across the rear surface of the vehicle.

24. Apparatus as defined in claim 20 including a first switch responsive to the presence of a vehicle in the washing area to initiate rotation of the brushes.

25. Apparatus as defined in claim 24 including a second switch responsive to the longitudinal position of the support means to reverse the directions of rotation of the brushes.

26. Apparatus as defined in claim 23 wherein the control means includes first cables connecting respective support means to the counterweights and second cables connecting respective support means to the fixed support points.

27. Apparatus as defined in claim 26 including slack take-up means connected to the second cables.

References Cited

UNITED STATES PATENTS

| | | | |
|---|---|---|---|
| 3,233,264 | 2/1966 | Nickl et al. | 15—21(C.O) |
| 3,304,565 | 2/1967 | Fuhring | 15—21(C.O) |
| 3,451,085 | 6/1969 | Hay | 15—21(C.O) |

FOREIGN PATENTS

| | | | |
|---|---|---|---|
| 1,520,119 | 2/1968 | France | 15—CCP |
| 1,523,276 | 3/1968 | France | 15—CCP |

EDWARD L. ROBERTS, Primary Examiner

U.S. Cl. X.R.

15—53